(12) United States Patent
Yu et al.

(10) Patent No.: US 9,907,025 B2
(45) Date of Patent: *Feb. 27, 2018

(54) DATA SENDING METHOD, APPARATUS AND SYSTEM

(71) Applicant: HUAWEI DEVICE (DONGGUAN) CO., LTD., Dongguan (CN)

(72) Inventors: Chengdong Yu, Shenzhen (CN); Konggang Wei, Shenzhen (CN); Yu Deng, Shanghai (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/298,069

(22) Filed: Oct. 19, 2016

(65) Prior Publication Data

US 2017/0041871 A1    Feb. 9, 2017

Related U.S. Application Data

(63) Continuation of application No. 14/708,804, filed on May 11, 2015, now Pat. No. 9,480,022, which is a
(Continued)

(30) Foreign Application Priority Data

Jun. 19, 2012    (CN) .......................... 2012 1 0203316

(51) Int. Cl.
*G08C 17/00*    (2006.01)
*H04W 52/02*    (2009.01)
(Continued)

(52) U.S. Cl.
CPC ......... *H04W 52/028* (2013.01); *H04W 24/08* (2013.01); *H04W 52/0225* (2013.01);
(Continued)

(58) Field of Classification Search
CPC ............. H04W 24/08; H04W 52/0225; H04W 52/0232; H04W 52/028; H04W 88/02; Y02B 60/50
See application file for complete search history.

(56) References Cited

U.S. PATENT DOCUMENTS 6,661,792 B1    12/2003 Park
8,107,416 B2    1/2012 Jeong et al.
(Continued)

FOREIGN PATENT DOCUMENTS

CN    1323495 A    11/2001
CN    101248404 A    8/2008
(Continued)

OTHER PUBLICATIONS

"3rd Generation Partnership Project; Technical Specification Group Radio Access Network; User Equipment (UE) procedures in idle mode and procedures for cell reselection in connected mode (Release 10)," 3GPP TS 25.304, V10.1.0, Technical Specification, Jun. 2011, 52 pages.
(Continued)

*Primary Examiner* — Kan Yuen
(74) *Attorney, Agent, or Firm* — Conley Rose, P.C.

(57)    ABSTRACT

A data sending method and apparatus are provided. In an embodiment, the method includes: detecting whether a wireless terminal has data to be sent to a wireless network side, where the data to be sent includes signaling data or user data; when a result of detecting whether the wireless terminal has data to be sent to the wireless network side is that the wireless terminal has no data to be sent, confirming that a power amplifier of the wireless terminal is in a non-working state; and when the result of detecting whether the wireless terminal has data to be sent to the wireless network side is that the wireless terminal has data to be sent, confirming that
(Continued)

the power amplifier of the wireless terminal is in a working state.

15 Claims, 5 Drawing Sheets

Related U.S. Application Data continuation of application No. 14/200,269, filed on Mar. 7, 2014, now Pat. No. 9,060,302, which is a continuation of application No. PCT/CN2012/087850, filed on Dec. 28, 2012.

(51) Int. Cl.
*H04W 24/08* (2009.01)
*H04W 88/02* (2009.01)

(52) U.S. Cl.
CPC ........ *H04W 52/0232* (2013.01); *H04W 88/02* (2013.01); *Y02B 60/50* (2013.01)

(56) References Cited

U.S. PATENT DOCUMENTS

| | | |
|---|---|---|
| 2001/0010687 A1 | 8/2001 | Lee et al. |
| 2006/0088008 A1 | 4/2006 | Kim |
| 2007/0287476 A1 | 12/2007 | Jeong et al. |
| 2008/0123791 A1 | 5/2008 | Majima |
| 2008/0186146 A1 | 8/2008 | Tripathi et al. |
| 2009/0129304 A1 | 5/2009 | Kim et al. |
| 2009/0180414 A1* | 7/2009 | Maeda ............... H04B 7/2643 370/311 |
| 2009/0262680 A1 | 10/2009 | Choi et al. |
| 2010/0111067 A1* | 5/2010 | Wu .................... H04W 74/008 370/345 |
| 2010/0124237 A1 | 5/2010 | Chun et al. |
| 2010/0128645 A1 | 5/2010 | Lin et al. |
| 2010/0246424 A1 | 9/2010 | Tsuzuki |
| 2010/0317301 A1 | 12/2010 | Wang et al. |
| 2011/0002253 A1 | 1/2011 | Cha et al. |
| 2012/0250538 A1 | 10/2012 | Su et al. |
| 2013/0039393 A1* | 2/2013 | Choi .................... H04L 1/1874 375/219 |
| 2013/0189992 A1* | 7/2013 | Farnsworth .......... H04W 36/22 455/437 |
| 2013/0195027 A1 | 8/2013 | Hsu et al. |
| 2013/0329614 A1 | 12/2013 | Thakur |
| 2013/0343268 A1 | 12/2013 | Wan et al. |
| 2014/0185456 A1 | 7/2014 | Yu et al. |

FOREIGN PATENT DOCUMENTS

| | | |
|---|---|---|
| CN | 101442812 A | 5/2009 |
| CN | 101547503 A | 9/2009 |
| CN | 101854708 A | 10/2010 |
| CN | 102136846 A | 7/2011 |
| CN | 102172085 A | 8/2011 |
| CN | 103517318 A | 1/2014 |
| EP | 2713645 A1 | 4/2014 |
| JP | H0322721 A | 1/1991 |
| JP | 07226707 A | 8/1995 |
| JP | 2008005212 A | 1/2008 |
| JP | 2009177774 A | 8/2009 |
| WO | 0033469 A1 | 6/2000 |
| WO | 2004056142 A1 | 7/2004 |
| WO | 2007115319 A2 | 10/2007 |
| WO | 2007144956 A1 | 12/2007 |
| WO | 2009090649 A2 | 7/2009 |
| WO | 2012032623 A1 | 3/2012 |
| WO | 2012120085 A1 | 9/2012 |

OTHER PUBLICATIONS

Muck, M., et al., "MIPI / DigRF Overview," XP014098500, Infineon, European Telecommunications Standards, Sep. 8, 2008, 6 pages.
Foreign Communication From a Counterpart Application, Japanese Application No. 2014-520527, Japanese Office Action dated Sep. 16, 2014, 3 pages.
Foreign Communication From a Counterpart Application, Japanese Application No. 2014-520527, English Translation of Japanese Office Action dated Sep. 16, 2014, 4 pages.
Foreign Communication From a Counterpart Application, PCT Application No. PCT/CN2012/087850, English Translation of International Search Report dated Mar. 28, 2013, 2 pages.
Foreign Communication From a Counterpart Application, PCT Application No. PCT/CN2012/087850, English Translation of Written Opinion dated Mar. 28, 2013, 12 pages.
Foreign Communication From a Counterpart Application, European Application No. 12878642.3, Extended European Search Report dated Jun. 12, 2014, 8 pages.
Office Action dated Jul. 17, 2014, 46 pages, Application No. 14/200,269 filed Mar. 7, 2014.
Office Action dated Jan. 21, 2016, 25 pages, Application No. 14//708,804, filed May 11, 2015.
Notice of Allowance dated Aug. 12, 2016, 13 pages, U.S. Appl. No. 14//708,804, filed May 11, 2015.
Machine Translation and Abstract of Japanese Publication No. JP2008005212, Jan. 10, 2008, 12 pages.
Machine Translation and Abstract of Japanese Publication No. JP07226707, Aug. 22, 1995, 6 pages.
Foreign Communication From a Counterpart Application, Japanese Application No. 2014-520508, Japanese Notice of Allowance dated May 7, 2015, 3 pages.
Foreign Communication From a Counterpart Application, Japanese Application No. 2014-520508, Japanese Office Action dated Nov. 18, 2014, 3 pages.
Foreign Communication From a Counterpart Application, Japanese Application No. 2014-520508, English Translation of Japanese Office Action dated Nov. 18, 2014, 3 pages.
Foreign Communication From a Counterpart Application, Chinese Application No. 201280003898.7, Chinese Office Action dated Nov. 6, 2015, 8 pages.
Foreign Communication From a Counterpart Application, European Application No. 12878218.2, Extended European Search Report dated May 26, 2015, 8 pages.
Foreign Communication From a Counterpart Application, PCT Application No. PCT/CN2012/077367, English Translation of International Search Report dated Apr. 4, 2013, 2 pages.
Foreign Communication From a Counterpart Application, PCT Application No. PCT/CN2012/077367, English Translation of Written Opinion dated Apr. 4, 2013, 12 pages.

* cited by examiner

DATA SENDING METHOD, APPARATUS AND SYSTEM

CROSS-REFERENCE TO RELATED APPLICATIONS

This application is a continuation of U.S. patent application Ser. No. 14/708,804, filed on May 11, 2015, now U.S. Pat. No. 9,480,022, which is a continuation of U.S. patent application Ser. No. 14/200,269, filed on Mar. 7, 2014, now U.S. Pat. No. 9,060,302, which is a continuation of International Application No. PCT/CN2012/087850, filed on Dec. 28, 2012, which claims priority to Chinese Patent Application No. 201210203316.1, filed on Jun. 19, 2012. All of the aforementioned patent applications are hereby incorporated by reference in their entireties.

TECHNICAL FIELD

The present disclosure relates to the field of wireless communications, and in particular, to a data sending method and apparatus.

BACKGROUND

In conventional wireless network data transmission processes, after a communication link is established between the wireless terminal and a wireless network (i.e., it is in a Dedicated Channel (DCH) state), the wireless network provides a dedicated communication link for a user of a wireless terminal device to send and receive data. To ensure normal interaction of communication data, after the user sends data to a wireless network side, the wireless terminal device keeps its uplink (i.e., from the wireless terminal device to the wireless network side) power amplifier (PA) in an "on" state for a relatively long period of time. The PA may amplify the power of data sent from the wireless terminal to the wireless network side. To ensure link quality in this period of time, the terminal device sends test report data at intervals, and turns off the PA until use of the DCH link is timed out. This timeout period is generally decided by the network, and is usually between 10 seconds to 60 seconds according to different standards, required multiplexing modes, and capacity configurations of the wireless network. In this period of time, a conventional wireless terminal device keeps its PA on whether or not there is data to be sent.

SUMMARY

Embodiments of the present disclosure provide a data sending method and apparatus which may reduce electrical power consumption of a wireless terminal device.

In one embodiment, a data sending method includes: detecting whether a wireless terminal has data to be sent to a wireless network side, wherein the data to be sent comprises signaling data or user data; when a result of detecting whether the wireless terminal has data to be sent to the wireless network side is that the wireless terminal has no data to be sent, confirming that a power amplifier of the wireless terminal is in a non-working state; and when the result of detecting whether the wireless terminal has data to be sent to the wireless network side is that the wireless terminal has data to be sent, confirming that the power amplifier of the wireless terminal is in a working state.

In another embodiment, a wireless terminal includes a baseband device and a power amplifier. The baseband device is configured to detect whether the wireless terminal has data to be sent, wherein the data to be sent comprises signaling data or user data; when a detection result is that the baseband device has no data to be sent, to send, to the power amplifier, a first message of confirming that the power amplifier is in a non-working state; and when the detection result is that the baseband device has data to be sent, to send, to the power amplifier, a second message of confirming that the power amplifier is in a working state. The power amplifier is configured to receive the respective first message or second message sent by the baseband device.

In yet another embodiment, a non-transitory computer readable storage medium includes computer program code stored thereon, such that when the computer program code is executed by a computer the computer program code causes the computer to: detect whether a wireless terminal has data to be sent to a wireless network side, wherein the data to be sent comprises signaling data or user data; when a result of detecting whether the wireless terminal has data to be sent to the wireless network side is that the wireless terminal has no data to be sent, confirming that a power amplifier of the wireless terminal is in a non-working state; and when the result of detecting whether the wireless terminal has data to be sent to the wireless network side is that the wireless terminal has data to be sent, confirming that the power amplifier of the wireless terminal is in a working state.

It may be seen from the foregoing solutions that, in the data sending method, and apparatus provided by at least some embodiments of the present disclosure, when it is determined that the wireless terminal has no data to be sent, it is confirmed that the power amplifier of the wireless terminal is in a non-working state, and thus the power amplifier does not work all the time. Consequently, the electrical energy consumption of the power amplifier of the wireless terminal is conserved, thereby reducing the electrical power consumption of the wireless terminal device.

DESCRIPTION OF EMBODIMENTS

In order to make the objectives, technical solutions, and advantages of the present disclosure more comprehensible, embodiments of the present disclosure are described in further detail in the following with reference to the accompanying drawings.

Figure 1:
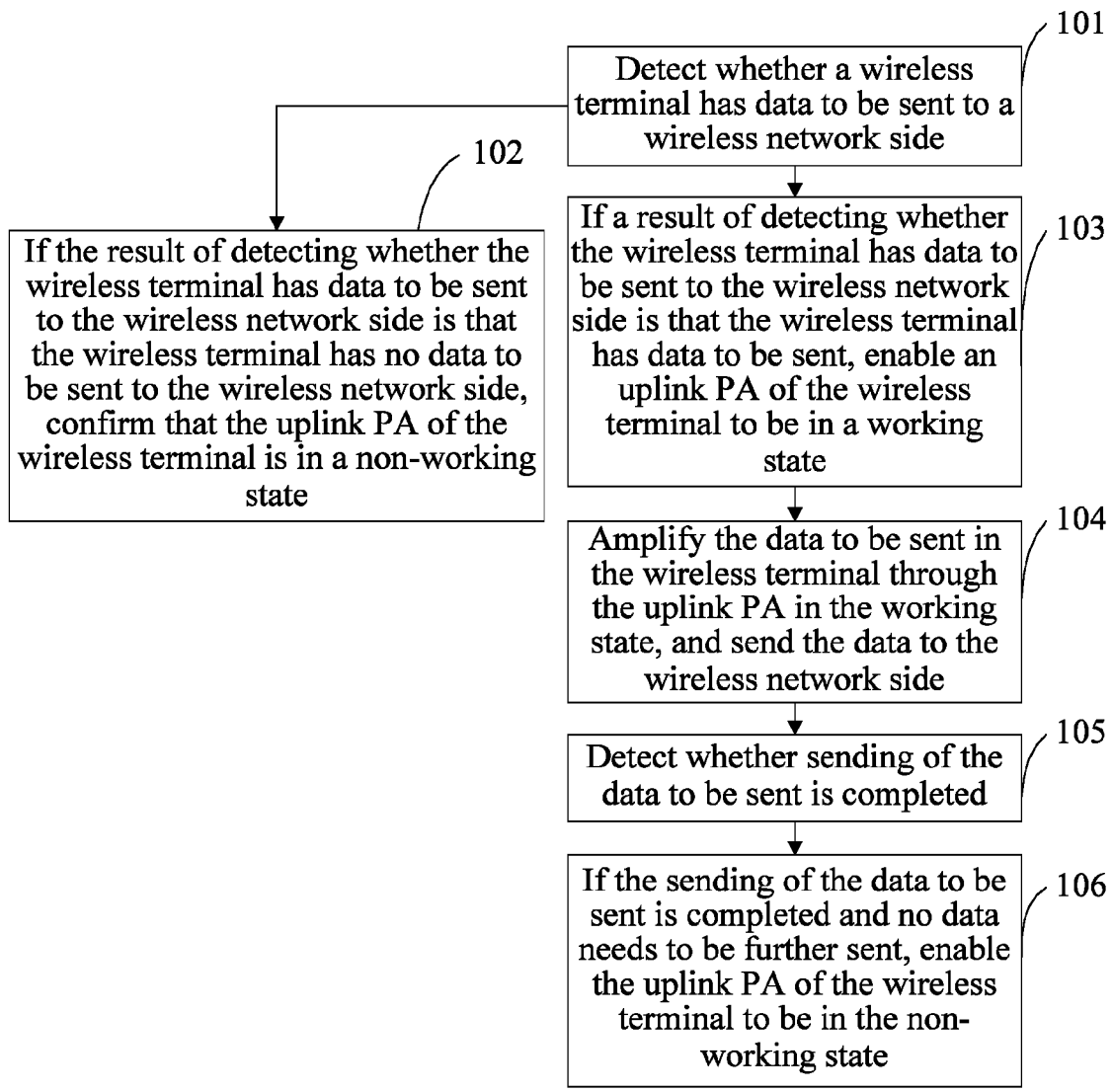
FIG. 1 is a flow chart of a data sending method in accordance with an Embodiment 1 of the present disclosure.

FIG. 1 is a flow chart of a data sending method in accordance with an Embodiment 1 of the present disclosure. As shown in FIG. 1, the method includes the following steps.

Step 101: Detect whether a wireless terminal has data to be sent to a wireless network side, where the data includes signaling data or user data.

Step 102: If a result of detecting whether the wireless terminal has data to be sent to the wireless network side is that the wireless terminal has no data to be sent to the wireless network side, confirm (i.e., ensure) that an uplink power amplifier of the wireless terminal is in a non-working state.

If the PA is in a working state, the PA is kept in the working state, and if the PA is not in the working state, the PA is enabled to be in the working state.

Step 103: If the result of detecting whether the wireless terminal has data to be sent to the wireless network side is that the wireless terminal has data to be sent, confirm (i.e., ensure) that the PA of the wireless terminal is in the working state.

Step 102 and step 103 may be in reverse order, which does not influence specific implementation of the embodiment of the present disclosure.

According to the foregoing data sending method, turnon or turnoff of the PA may be controlled according to whether the wireless terminal has data to be sent. Because the PA is turned off when data sending is finished or there is no data to be sent to the wireless network side, uplink power consumption of the wireless terminal can be reduced, and when the wireless terminal does not need to interact with the wireless network side, it is implemented that the wireless terminal saves energy and electrical power.

After step 103, the foregoing method may also include at least one of the following steps.

Step 104: Amplify the data to be sent in the wireless terminal through the uplink PA in the working state, and send the data to the wireless network side.

Step 105: Detect whether sending of the data to be sent is completed.

Step 106: If the sending of the data to be sent is completed, confirm that the PA of the wireless terminal is in the non-working state. The non-working state herein may include two working modes, that is, a sleep mode and a power off mode.

One of the following three detection manners may be adopted to detect whether the wireless terminal has data to be sent to the wireless network side.

First manner: A baseband chip of the wireless terminal detects whether at least one radio frame exists in a first memory that is in the wireless terminal and is connected to the baseband chip of the wireless terminal. The result of detecting whether the wireless terminal has data to be sent to the wireless network side is that the wireless terminal has no data to be sent includes that no radio frame exists in the first memory. The result of detecting whether the wireless terminal has data to be sent to the wireless network side is that the wireless terminal has data to be sent includes that at least one radio frame exists in the first memory. If no radio frame exists in the first memory, the baseband chip considers that there is no data to be sent. If at least one radio frame exists in the first memory, the baseband chip considers that there is data to be sent. The at least one radio frame is stored in the first memory after being received by the baseband chip from an application processor (AP) of the wireless terminal.

Second manner: The detecting, by the baseband chip of the wireless terminal, whether the wireless terminal has data to be sent to the wireless network side may include detecting whether there is data to be sent on a layer 1 of the baseband chip of the wireless terminal. The detecting whether there is data to be sent on the layer 1 of the baseband chip of the wireless terminal may specifically include detecting whether there is data to be sent in an encoder of the baseband chip. If there is data to be sent in the encoder of the baseband chip (for example, data of at least one radio frame exists), the baseband chip considers that there is data to be sent. If there is no data to be sent in the encoder of the baseband chip, the baseband chip considers that there is no data to be sent.

Third manner: The baseband chip of the wireless terminal detects whether there is data to be sent on a layer 3 of the baseband chip of the wireless terminal. Specifically, it may be detected whether there is data to be sent on a packet data convergence protocol (PDCP) sublayer of the layer 3. If the wireless terminal has data to be sent, before it is confirmed that the PA of the wireless terminal is in the working state, the method may also include storing, by the layer 3, the data to be sent in a second memory of the wireless terminal. After it is confirmed that the PA of the wireless terminal is in the working state, and before the data to be sent in the wireless terminal is amplified through the PA in the working state and is sent to the wireless network side, the method may also include: reading, by the layer 1 of the baseband chip of the wireless terminal, the data to be sent from the second memory. The second memory may be positioned in the baseband chip, and may also be positioned in the wireless terminal and connected to the baseband chip. The layer 1 may read, at preset intervals, the data to be sent from the second memory. Preferably, the preset interval may be 10 milliseconds.

The detecting whether the wireless terminal has data to be sent to the wireless network side also includes: detecting, by the baseband chip of the wireless terminal, whether data exists in the second memory that is in the wireless terminal and is connected to the baseband chip of the wireless terminal, or is positioned in the baseband chip; where the result of detecting whether the wireless terminal has data to be sent to the wireless network side is that the wireless terminal has no data to be sent includes that the data does not exist in the second memory; and the result of detecting whether the wireless terminal has data to be sent to the wireless network side is that the wireless terminal has data to be sent includes that the data exists in the second memory, where the data is all or a part of the at least one radio frame.

Protocol layering of a third generation partnership program (3GPP) air interface is briefly introduced herein. Protocol layers of a 3GPP air interface include a network application layer, that is, a top layer. A layer 3, marked as L3, includes various types of messages and programs, so as to control and manage services. A layer 2 and a layer 1 are successively positioned below the layer 3 in the protocol layering of an air interface. The layer 2 is a data link layer, marked as L2, and is a middle layer. The L2 includes various types of data transmission structures, so as to control data transmission and ensure establishment of a reliable dedicated data link between a mobile station and a base station. The layer 1 is a physical layer, marked as L1, and is a bottom layer, which provides a radio link required for bit stream transmission. The L1, L2, and L3 are three independent 3GPP protocol layers in the wireless terminal.

In step 103, after it is confirmed that the PA of the wireless terminal is in the working state, the method may also include notifying, by the layer 1 of the baseband chip of the wireless terminal, the layer 3 of a message of successfully confirming that the PA of the wireless terminal is in the working state.

The notifying, by the layer 1 of the baseband chip of the wireless terminal, the layer 3 of the message of successfully confirming that the PA of the wireless terminal is in the working state may include: determining, by the layer 1 of the baseband chip of the wireless terminal, that a state of a first flag bit corresponds to that the PA is in the working state, so that the layer 3 reads the determined first flag bit, where the first flag bit is used for representing whether the PA of the wireless terminal is in the working state. The first flag bit may be an identifier (for example, a 1-bit Boolean variable, where when the variable is set, a value of the variable is 1, which represents that the PA is in the working state, and when the variable is not set, a value of the variable is 0, which represents that the PA is not successfully turned on), and may be marked as F1. For the first flag bit, reference may be made to description of a first flag bit in step 209.

In step 106, after the sending of the data to be sent is completed, the method may include notifying, by the layer 1 of the baseband chip of the wireless terminal, the layer 3 of a message of completing the sending of the data to be sent. The layer 3 may perform control to turn off the PA according to the message of completing the sending of the data to be sent.

The notifying, by the layer 1 of the baseband chip of the wireless terminal, the layer 3 of the message of completing the sending of the data to be sent may include: determining, by the layer 1 of the baseband chip of the wireless terminal, that a state of a second flag bit corresponds to that the sending of the data to be sent is completed, so that the layer 3 reads the determined second flag bit, where the second flag bit is used for representing whether the sending of the data to be sent is completed. The second flag bit may be an identifier (for example, a 1-bit Boolean variable, where when the variable is set, a value of the variable is 1, which represents that the sending of the data to be sent is completed, and when the variable is not set, a value of the variable is 0, which represents that the sending of the data to be sent is not completed), and may be marked as F2. For the second flag bit F2, reference may be made to description about a second flag bit in step 215 in Embodiment 2, and details are not repeatedly described herein.

The reading, by the layer 3, the determined first flag bit may include: reading, by the layer 3, the determined first flag bit at preset intervals.

The reading, by the layer 3, the determined second flag bit may include: reading, by the layer 3, the determined second flag bit at preset intervals.

The preset interval may be 10 milliseconds.

In step 102 and step 106, the confirming that the PA of the wireless terminal is in the non-working state may include: sending, by the baseband chip of the wireless terminal, a first command to a serial peripheral interface (SPI) of the PA through a SPI bus, where the first command controls the PA to be in a sleep state. When the PA is in the sleep state, compared with a situation that the PA is in the working state, only a small amount of electrical power is consumed, thereby saving a large amount of electrical energy compared with the situation that the PA is in the working state.

In step 102 and step 106, the confirming that the PA of the wireless terminal is in the non-working state may include: sending, by the baseband chip of the wireless terminal, a second command to a digital radio frequency (DigRF) interface of the PA through a DigRF bus, where the second command controls the PA to be in a sleep state. As is known in the art, DigRF is a digital interface standard defined and supported by the Mobile Industry Processor Interface (MIPI) Alliance.

In step 102 and step 106, the confirming that the PA of the wireless terminal is in the non-working state may include sending, by the baseband chip of the wireless terminal, a third command to an enable interface (EN) of the PA, where the third command controls the PA to be in a sleep state.

In step 102 and step 106, the confirming that the PA of the wireless terminal is in the non-working state may include stopping, by a power supplier of the wireless terminal, supplying power to the PA, so that the PA is powered off. Specifically, a direct current to direct current (DC/DC) converter may be serially connected between the power supplier and the PA, and the DC/DC converter is controlled through the baseband chip, so as to control whether the power supplier supplies power to the PA. When the power supplier does not supply power to the PA, the PA is powered off. The controlling the DC/DC converter through the baseband chip is an existing technology, and is not described in detail herein.

In step 105, the detecting whether the sending of the data to be sent is completed may include detecting whether a duration of time since it is detected that the wireless terminal has data to be sent exceeds 20 milliseconds. The completing the sending of the data to be sent includes that a duration of time since it is detected that the wireless terminal has data to be sent exceeds 20 milliseconds.

Figure 2:
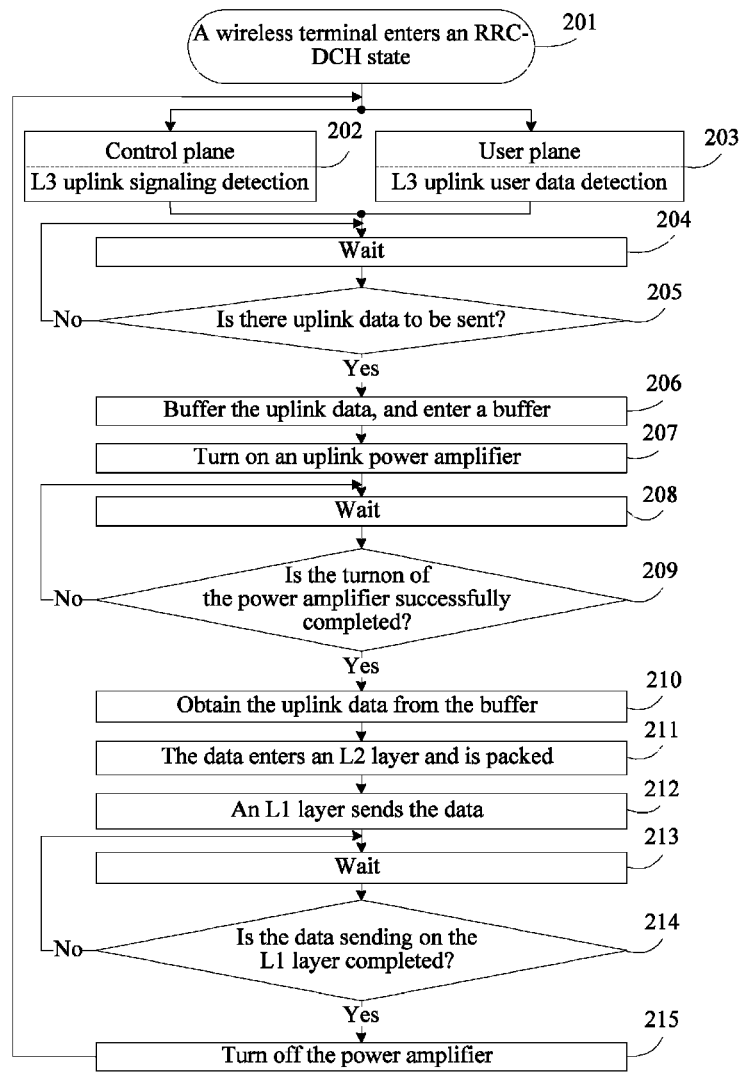
FIG. 2 is a flow chart of a data sending method in accordance with an Embodiment 2 of the present disclosure.

FIG. 2 is a flow chart of a data sending method in accordance with an Embodiment 2 of the present disclosure. As shown in FIG. 2, the method includes the following steps.

Step 201: A wireless terminal enters a radio resource control (RRC)-DCH state, that is, a DCH connection is established between the wireless terminal and a network side.

Step 202: Detect uplink signaling data in a control plane of a layer 3 of a baseband chip of the wireless terminal.

Step 203: Detect uplink user data in a user plane of the layer 3 of the baseband chip of the wireless terminal.

There is no strict limitation to execution order of step 202 and step 203. Either of step 202 and step 203 may be executed first, and step 202 and step 203 may also be executed simultaneously. For a detection manner in step 202 and step 203, reference may be made to one of the three detection manners adopted to detect whether the wireless terminal has data to be sent to the wireless network side in Embodiment 1 of the present disclosure, and details are not repeatedly described herein.

Step 204: After signaling detection in step 202 and user data detection in step 203, the wireless terminal waits a period of time, so as to organize the signaling data and/or the user data obtained in step 202 and step 203. The waiting time may preferably be 5 milliseconds.

Step 205: The L3 of the wireless terminal detects whether the L3 has uplink data to be sent. The uplink data may include the signaling data and/or the user data obtained in step 202 and step 203. When a detection result is that there is no uplink data, the wireless terminal returns to step 204 and continues to wait. If the detection result is that there is uplink data, proceed to step 206.

Step 206: When uplink data is detected, the L3 of the wireless terminal temporarily stores the uplink data in a second memory of the wireless terminal. Preferably, the second memory may be positioned on the L3 of the baseband chip. Definitely, the memory may also be positioned on an L2 or L1 of the wireless terminal as long as data access on any one of the L3 to the L1 is convenient. Optionally, the second memory may also be positioned in the wireless terminal and connected to the baseband chip. A size of the second memory is acceptable as long as the second memory can buffer a part of the uplink data. For example, the size of the second memory may be set to 1 KB (Bytes, byte). When the uplink data is stored, a starting address and a length of an uplink data buffer may be recorded in the second memory. Because different wireless terminals have different processing capabilities, the uplink data may be sent to the wireless network side in real time while being generated. Therefore, setting of the second memory is optional. This step is also optional.

Step 207: After all or a part of the uplink data of the L3 is stored in the second memory, the L3 may actively notify the L1 that the L3 has uplink data to be sent to the wireless network side. It may also be that the L1 actively learns that the L3 has uplink data to be sent to the wireless network side, and then the baseband chip is enabled to turn on a PA.

The learning, by the L1, that the L3 has uplink data to be sent to the wireless network side may include checking the second memory at preset intervals, where if data exists in the second memory, the data is the uplink data to be sent.

Step 208: The L1 waits a period of time, and confirms that the turnon of the PA is completed. A current radio frequency PA may be reliably turned on within 5 milliseconds. Therefore, a timer with a 5-millisecond (ms) delay may be set, and when the timing ends, it is determined that the turnon of the PA is completed.

Step 209: The L1 determines whether the turnon of the PA is finished. Whether the turnon of the PA is finished may be determined by detecting an input/output port (I/O port) of the PA. For example, it may be preset that when the I/O port of the PA is at a high level, the turnon of the PA is correspondingly finished, and when the I/O port of the PA is at a low level, the turnon of the PA is correspondingly not finished. It may also be preset that when the I/O port of the PA is at a low level, the turnon of the PA is correspondingly finished, and when the I/O port of the PA is at a high level, the turnon of the PA is correspondingly not finished. The high level may refer to a logical voltage higher than 1.5 V, and the low level may refer to a logical voltage lower than 0.3 V. The determination result may be embodied by setting an identifier (for example, a 1-bit Boolean variable, where when the variable is set, a value of the variable is 1, and when the variable is not set, a value of the variable is 0) in the wireless terminal (for example, in a memory of the wireless terminal, which may specifically be the first memory or the second memory), where the identifier is marked as a first flag bit F1. The identifier F1 may be accessed by any one of the L3, L2, and L1. The F1 is set to prevent a data stream sent from the L3 to the L1 from incorrectly entering a subsequent process in a situation that the PA is not ready, thereby ensuring execution accuracy of the method in this embodiment. In this embodiment, it may be set that when the F1 is set, it represents that the PA positioned on the L1 is in a working state, and when the F1 is not set, it represents that the PA positioned on the L1 is not successfully turned on. Specifically, the F1 may be accessed by any one of the L1 to the L3. After the L1 finishes turning on the PA, the L1 sets the F1. The L3 reads a value of the F1 after the L1 sets the F1, so that it may be learned that the turnon of the PA is completed and uplink data transmission may be performed. The reading, by the L3, the determined first flag bit includes reading, by the L3, the determined first flag bit at preset intervals. The preset interval may be 10 milliseconds. Definitely, when the wireless terminal has a strong real-time processing capability and enables that the PA may be turned on in real time when there is data to be sent, this step is unnecessary. If the turnon of the PA is finished, proceed to step 210. If the turnon of the PA is not finished, return to step 208 and the L1 continues to wait.

Step 210: After the turnon of the PA is finished, the L3 obtains, from the second memory, data to be uploaded, and prepares to send the data. As described in step 206, because data may be delivered from the L3 to the L1 in real time and waits to be sent, the setting of the second memory is optional, and the obtaining the data from the second memory in this step is optional.

Step 211: After obtaining the data to be uploaded, the L3 passes the data to the L2 for packing. That is, the L2 encapsulates the data to be uploaded in a format suitable for transmission in a radio channel, so as to send the data to the wireless network side.

Step 212: After the L2 sends, to the L1, the data to be uploaded, the L1 sends, to the wireless network side, the data to be uploaded.

Step 213: The wireless terminal waits for the L1 to transmit the data to be uploaded.

Step 214: The L1 determines whether sending of all the data to be uploaded is completed. If the sending is not completed, return to step 213 and the wireless terminal continues to wait for the sending of the data to be completed. If the sending is completed, proceed to step 215. The determining whether the sending of all the data to be uploaded is completed may include detecting whether a duration of time since it is detected that the wireless terminal has data to be sent exceeds 20 milliseconds. The completing the sending of the data to be sent includes that the duration of time since it is detected that the wireless terminal has data to be sent exceeds 20 milliseconds. The duration of 20 milliseconds is obtained through delay determination. Because a length of a radio frame is 10 milliseconds, a duration starting when it is detected by the baseband chip that the wireless terminal has data to be sent and ending when the sending of the radio frame is finished may be set as twice a redundancy, that is, 20 milliseconds. It is considered that the sending of one radio frame is completed after 20 milliseconds.

Step 215: After completing sending the data, the L1 notifies the L3 that the sending of the data is completed. The notification may specifically be embodied by setting an identifier (for example, a 1-bit Boolean variable, where when the variable is set, a value of the variable is 1, and when the variable is not set, the value of the variable is 0) in the wireless terminal (for example, in a memory of the wireless terminal, which may specifically be the first memory or the second memory), where the identifier is marked as a second flag bit F2. The identifier F2 may be accessed by any one of the L3, L2, and L1. In this embodiment, the F2 may be set that when the F2 is set, it represents that the sending of the data to be sent is completed by the L1, and when the F2 is not set, it represents that the sending of the data to be sent is completed by the L1. Specifically, the F2 may be accessed by any one of the L1 to the L3. After the L1 finishes turning off the PA, the L1 sets the F2. The L3 reads a value of the F2 after the L1 sets the F2, so that it may be learned that the sending of the uplink data is completed. When the L3 of the baseband chip learns that the sending of the uplink data is completed, the L3 performs control to turn off the PA.

In the method in the embodiment of the present disclosure, on the basis of the method in Embodiment 1, in the embodiment of the present disclosure, a manner of setting a waiting time is adopted to ensure completeness of data sending and complete turnon of the PA. Because the PA is turned off when data sending is finished or there is no data to be sent to the wireless network side, uplink power consumption of the wireless terminal can be reduced, and when the wireless terminal does not need to interact with the wireless network side, it is implemented that the wireless terminal saves energy and electrical power.

Figure 3:
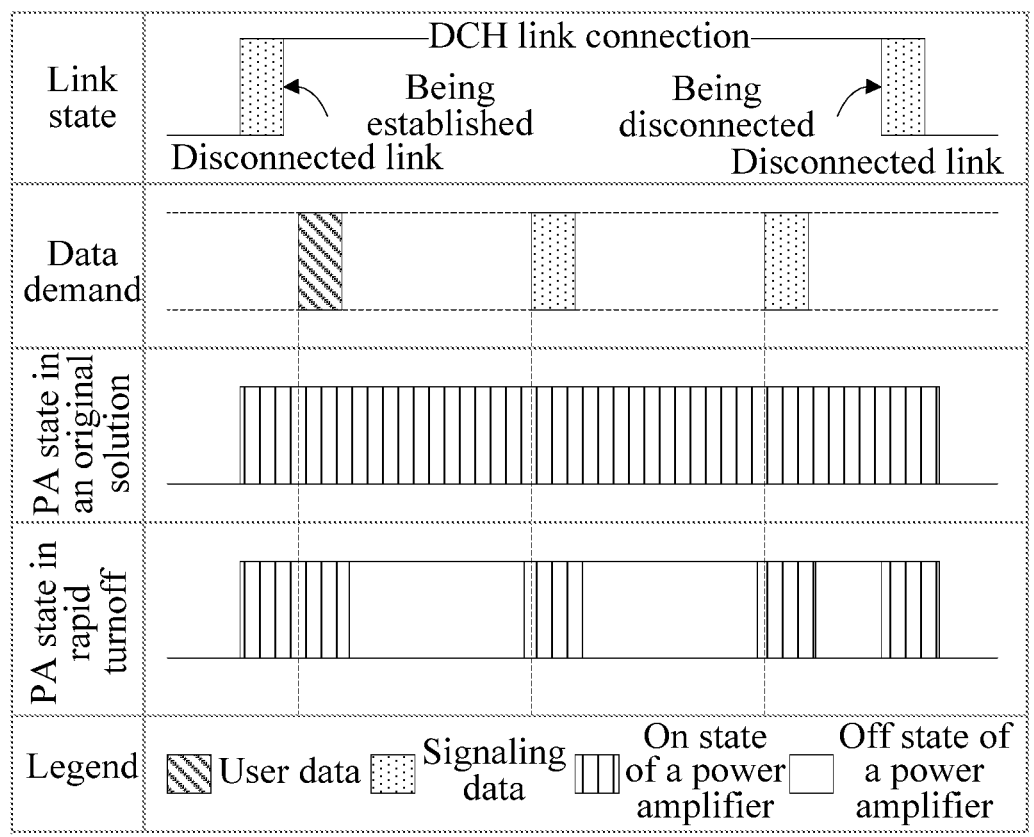
FIG. 3 is a timing diagram for a power amplifier using a data sending method in accordance with an embodiment of the present disclosure as compared with a conventional approach.

FIG. 3 illustrates a specific effect of implementing reducing of power consumption by adopting the method in an embodiment of the present disclosure. As shown in FIG. 3, a user may open a web page through a wireless network on a wireless terminal. It can be seen from a link state (as shown by a first row in FIG. 3) that, a protocol stack of the wireless terminal sends request signaling (as shown by a first dot matrix square in the first row in FIG. 3), so as to establish a DCH link with a base station on a wireless network side. In view of a data demand, user data (as shown by a diagonal square in a second row in FIG. 3) is first sent to the wireless network, and a measurement report (a type of signaling data as shown by a dot matrix square in the second row in FIG. 3) is subsequently sent to the wireless network at certain intervals. When the wireless network finds that the user does not send data for a long time (the time is decided by the network side and is generally 10 seconds to 60 seconds, the wireless network actively disconnects the link (as shown by a second dot matrix square in the first row in FIG. 3). It can be seen from an original solution of the prior art that, in an entire process from the establishment to the disconnection of the DCH link, the PA is in an on state all along. That is, the PA is on even if it is determined that there is no user data or signaling data. After the data sending method in the embodiment of the present disclosure is adopted, the power amplifier is turned on according to an actual sending demand of the data, and the PA is immediately turned off after the sending of uplink data is completed, which avoids an unnecessary waste of power consumption. In the data demand in the second row in FIG. 3, after the user data and the signaling data correspond to the PA off state in a fourth row, the turnoff and turnon of the PA still need a slight delay. This delay is a safety delay, which ensures complete turnoff and turnon of the PA. Preferably, it may be set that the radio frequency PA is reliably turned on within 5 milliseconds. Specifically, a timer with a 5-ms delay may be set, and when the timing ends, it may be determined that the turnon or the turnoff of the PA is completed.

Figure 4:
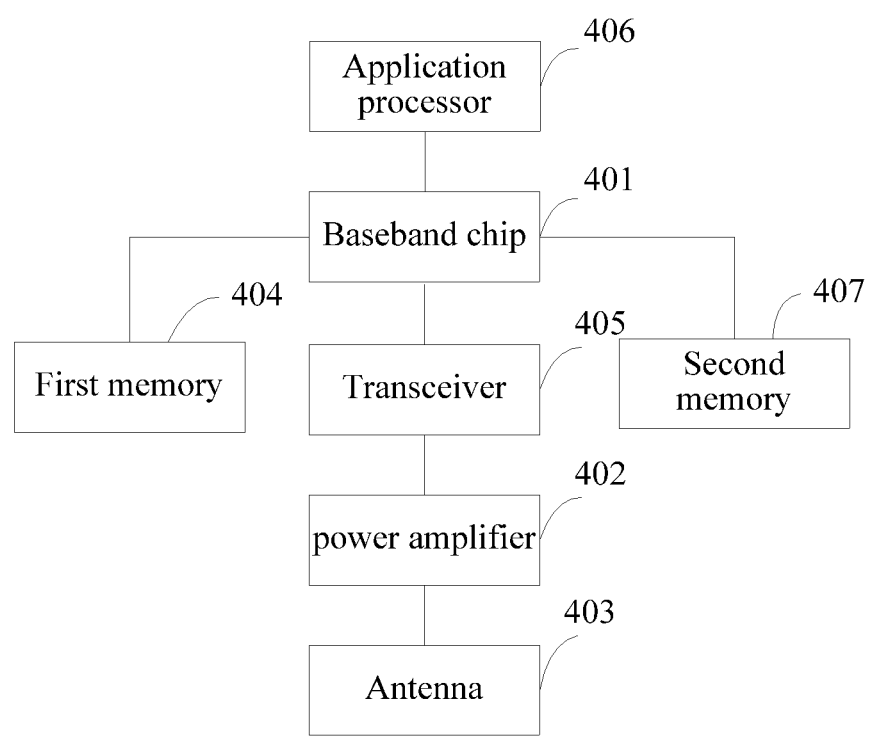
FIG. 4 is a schematic structural diagram of a wireless terminal in accordance with an Embodiment 3 of the present disclosure.

FIG. 4 is a schematic structural diagram of a wireless terminal in accordance with an Embodiment 3 of the present disclosure. As shown in FIG. 4, the wireless terminal includes the following components: a baseband chip 401 configured to detect whether the baseband chip has data to be sent, where the data to be sent includes signaling data or user data; if a detection result is that the baseband chip has no data to be sent, send, to a PA, a first message of confirming that the PA is in a non-working state; and if the detection result is that the baseband chip has data to be sent, send, to the PA, a second message of confirming that the PA is in a working state; and the PA 402 configured to receive the first message sent by the baseband chip, and confirm, according to the first message, that the PA is in a non-working state, or configured to receive the second message sent by the baseband chip, and confirm, according to the second message, that the PA is in a working state.

In the wireless terminal in this embodiment, turnon or turnoff of the PA may be controlled according to whether there is data to be sent. Because the PA is only turned on when data is sent, uplink power consumption of the wireless terminal can be reduced, and when the wireless terminal does not need to interact with a wireless network side, it is implemented that the wireless terminal saves energy and electrical power.

The wireless terminal in this embodiment may also include a transceiver 405 configured to receive the data to be sent from the baseband chip, modulate the data to be sent, and send modulated first data to the PA.

The PA 402 is also configured to amplify the modulated first data.

The wireless terminal in this embodiment may also include an antenna 403 configured to send second data amplified by the PA to the wireless network side.

The baseband chip 401 may also be configured to detect whether the sending of the data to be sent is completed, and if the sending of the data to be sent is completed, send, to the PA, the first message of confirming that the PA is in a non-working state.

The wireless terminal in this embodiment may also include an AP 406 configured to generate the data to be sent and send, to the baseband chip, the data to be sent.

The baseband chip in this embodiment receives the data to be sent from the AP and stores at least one radio frame of the data to be sent in a first memory 404; if the data to be sent does not exist in the first memory, a corresponding detection result is that the baseband chip has no data to be sent; and if the at least one radio frame of the data to be sent exists in the first memory, the corresponding detection result is that the baseband chip has data to be sent. The wireless terminal in this embodiment may also include the first memory 404 connected to the baseband chip, where the first memory 404 is configured to store the at least one radio frame of the data to be sent.

Further, the wireless terminal may also include a second memory 407 that is connected to the baseband chip 401 (as shown in FIG. 4) or positioned in the baseband chip (not shown), where the second memory 407 is configured to store the data. For a specific application of the second memory, reference may be made to the introduction of the second memory in Embodiment 1.

When the first memory has the at least one radio frame, the baseband chip 401 stores, in the second memory 407, all or a part of the at least one radio frame in the first memory; if there is no data in the second memory, a corresponding detection result is that the baseband chip has no data to be sent; and if there is data in the second memory, the corresponding detection result is that the baseband chip has data to be sent, where the data is all or a part of the at least one radio frame.

The baseband chip 401 is also configured to store the data to be sent in the second memory 407 and read the data to be sent from the second memory 407.

The baseband chip 401 is specifically configured to read, at preset intervals, the data to be sent from the second memory 407. Preferably, the preset interval may be 10 milliseconds.

The detecting, by the baseband chip 401, whether the wireless terminal has data to be sent may specifically include detecting, by the baseband chip, whether the data to be sent exists in an encoder of the baseband chip, where the data to be sent is sent to the baseband chip by the AP.

The sending, by the baseband chip and to the PA, the first message of confirming that the PA is in a non-working state may specifically include: sending, by the baseband chip, a first command to an SPI of the PA through a serial peripheral interface SPI bus, where the first command controls the PA to be in a sleep state.

The sending, by the baseband chip and to the PA, the first message of confirming that the PA is in a non-working state may also specifically include sending, by the baseband chip, a second command to a DigRF interface of the PA through a DigRF bus, where the second command controls the PA to be in a sleep state.

The sending, by the baseband chip and to the PA, the first message of confirming that the PA is in a non-working state may specifically include sending, by the baseband chip, a third command to an enable interface EN of the PA, where the third command controls the PA to be in a sleep state.

The sending, by the baseband chip and to the PA, the first message of confirming that the PA is in a non-working state may specifically include notifying, by the baseband chip, a power supplier of stopping supplying power to the PA, so that the PA is powered off.

In the wireless terminal in the embodiment of the present disclosure, when it is determined that the first memory stores at least one radio frame, the PA is turned on, and the PA is turned off until the sending of the data to be sent is finished; and the data to be sent which is transmitted in the baseband chip is buffered through the second memory, thereby ensuring completeness of uplink data transmission and efficiency of uplink transmission.

Figure 5:
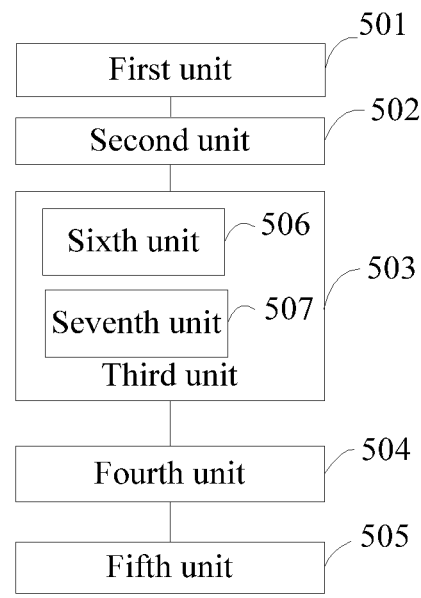
FIG. 5 is a schematic structural diagram of a data sending apparatus in accordance with an Embodiment 4 of the present disclosure.

FIG. 5 is a schematic structural diagram of a data sending apparatus in accordance with an Embodiment 4 of the present disclosure. As shown in FIG. 5, the data sending apparatus includes: a first unit 501 configured to detect whether a wireless terminal has data to be sent to a wireless network side, where the data includes signaling data or user data; a second unit 502 configured to, when a result of detecting whether the wireless terminal has data to be sent to the wireless network side is that the wireless terminal has no data to be sent, confirm that a power amplifier PA of the wireless terminal is in a non-working state; and a third unit 503 configured to, when the result of detecting whether the wireless terminal has data to be sent to the wireless network side is that the wireless terminal has data to be sent, confirm that the PA of the wireless terminal is in a working state, so that the PA amplifies the data to be sent and sends the amplified data to be sent to the wireless network side.

The data sending apparatus in this embodiment may also include: a fourth unit 504 configured to detect whether sending of the data to be sent is completed; and a fifth unit 505 configured to confirm that the PA of the wireless terminal is in a non-working state when the sending of the data to be sent is completed. The first unit 501, second unit 502, third unit 503, etc. of the data sending apparatus shown in FIG. 5 may be implemented in hardware (e.g., processor, application-specific integrated circuit (ASIC)) or a combination of hardware and software.

The first unit may specifically be configured to detect whether there is data to be sent on a layer 3 of the baseband chip of the wireless terminal.

Further, the first unit may specifically be configured to detect whether there is data to be sent on a packet data convergence protocol PDCP sublayer of the layer 3.

Or the first unit may specifically be configured to detect whether there is data to be sent on a layer 1 of the baseband chip of the wireless terminal.

Further, the first unit may specifically be configured to detect whether there is data to be sent in an encoder of the baseband chip.

Or the first unit may specifically be configured to detect whether at least one radio frame exists in a first memory that is in the wireless terminal and is connected to the baseband chip of the wireless terminal; where if at least one radio frame exists, the wireless terminal has data to be sent; and if no radio frame exists, the wireless terminal has no data to be sent. The at least one radio frame is stored in the first memory after being received by the baseband chip from an AP of the wireless terminal.

The first unit is specifically configured to detect whether data exists in a second memory that is in the wireless terminal and is connected to the baseband chip of the wireless terminal, or is positioned in the baseband chip; where if data exists, the wireless terminal has data to be sent; and if no data exists, the wireless terminal has no data to be sent. The data is all or a part of the at least one radio frame.

The third unit may also include a seventh unit 507 configured to notify the layer 3 of a message of successfully confirming that the PA of the wireless terminal is in a working state.

The seventh unit may specifically be configured to determine that a state of a first flag bit corresponds to that the PA is in the working state, so that the layer 3 reads the determined first flag bit, where the first flag bit is used for representing whether the PA of the wireless terminal is in the working state.

The fifth unit may specifically be configured to notify the layer 3 of a message of completing the sending of the data to be sent, so that the layer 3 confirms that the PA of the wireless terminal is in the non-working state.

The fifth unit may specifically be configured to determine that a state of a second flag bit corresponds to that the sending of the data to be sent is completed, so that the layer 3 reads the determined second flag bit, where the second flag bit is used for representing whether the sending of the data to be sent is completed.

The second unit and the fifth unit may specifically be configured to send a first command to an SPI of the PA through a serial peripheral interface SPI bus, where the first command controls the PA to be in a sleep state.

Or the second unit and the fifth unit may specifically be configured to send a second command to a DigRF interface of the PA through a DigRF bus, where the second command controls the PA to be in a sleep state.

Or the second unit and the fifth unit may specifically be configured to send a third command to an enable end EN of the PA, where the third command controls the PA to be in a sleep state.

Or the second unit and the fifth unit may specifically be configured to stop supplying power to the PA, so that the PA is powered off.

The fourth unit may specifically be configured to detect whether a duration of time since it is detected that the wireless terminal has data to be sent exceeds 20 milliseconds; and if the duration of time since it is detected that the wireless terminal has data to be sent exceeds 20 milliseconds, the sending of the data to be sent is completed.

In the data sending apparatus in the embodiment of the present disclosure, when it is determined that the first memory stores at least one radio frame, the PA is turned on, and the PA is turned off until the sending of the data to be sent is finished; and the data to be sent which is transmitted in the baseband chip is buffered through the second memory, thereby ensuring completeness of uplink data transmission and efficiency of uplink transmission.

Figure 6:
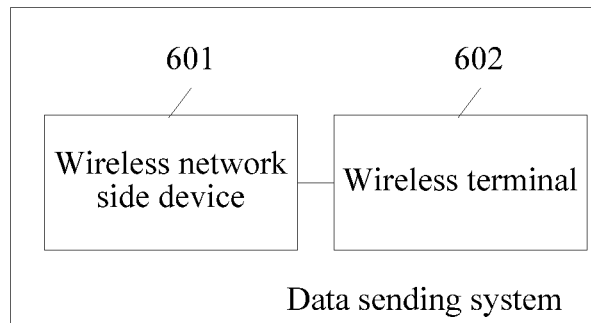
FIG. 6 is a schematic structural diagram of a data sending system in accordance with an Embodiment 5 of the present disclosure.

FIG. 6 is a schematic structural diagram of a data sending system in accordance with an Embodiment 5 of the present disclosure. As shown in FIG. 6, the data sending system includes a wireless terminal 602 and a wireless network side device 601 in the foregoing embodiments. The wireless terminal 602 and the wireless network side device 601 are in a communication connection. The wireless network side device 601 may specifically be a base station device positioned on a wireless network side. Therefore, for a specific implementation manner of the wireless terminal, reference may made to the implementation manner of the wireless terminal described in Embodiment 3, and details are not repeatedly described herein.

Figure 7:
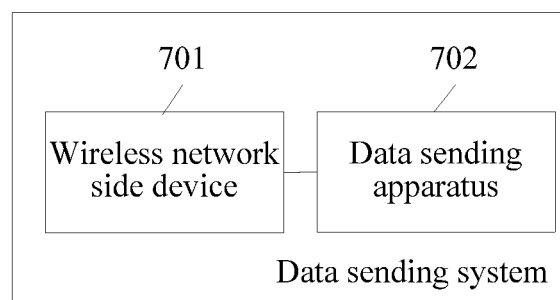
FIG. 7 is a schematic structural diagram of a data sending system in accordance with an Embodiment 6 of the present disclosure.

FIG. 7 is a schematic structural diagram of a data sending system in accordance with an Embodiment 6 of the present disclosure. As shown in FIG. 7, the data sending system includes a data sending apparatus 702 and a wireless network side device 701 in the foregoing embodiments. The data sending apparatus 702 and the wireless network side device 701 are in a communication connection. The wireless network side device 701 may specifically be a base station device positioned on a wireless network side. Therefore, for a specific implementation manner of the data sending apparatus, reference may be made to the implementation manner of the data sending apparatus described in Embodiment 4, and details are not repeatedly described herein.

Embodiment 7 of the present disclosure provides a data sending method. A difference between this embodiment and Embodiment 1 of the present disclosure lies in that step 101 is detecting, before a connection to a wireless network side is established, whether a wireless terminal has data to be sent to the wireless network side, where the data to be sent includes signaling data for establishing the connection between the wireless terminal and the wireless network side.

Specifically, the signaling data for establishing the connection between the wireless terminal and the wireless network side may be request data initiated by the wireless terminal to the wireless network side for establishing a DCH link connection. The request data is sent to the wireless network side through a random access channel (RACH).

Apparently, when the data sending method in Embodiment 7 is compared with that in Embodiment 2, a difference lies in that the data to be sent to the wireless network side is sent before the connection to the wireless network side is established, which is different from the situation in Embodiment 2 that the data to be sent to the wireless network side is sent after the wireless terminal enters an RRC-DCH state.

In the data sending method in the embodiment of the present disclosure, the focus is on whether there is data to be sent to the wireless network side before the connection to the wireless network side is established, that is, the request data for establishing the DCH link connection, which corresponds to a link establishment request in the first row in FIG. 3. If the link establishment request exists, a baseband chip of the wireless terminal performs control to turn on a PA. After the sending of the link establishment request is finished, the baseband chip performs control to turn off the PA, thereby effectively reducing electrical power consumption of the PA and the wireless terminal.

Embodiment 8 of the present disclosure provides a wireless terminal. Compared with Embodiment 3 of the present disclosure, a difference lies in that the baseband chip 401 is configured to detect, before a connection to a wireless network side is established, whether the baseband chip has data to be sent to the wireless network side, where the data to be sent includes signaling data for establishing the connection between the wireless terminal and the wireless network side; if a detection result is that the baseband chip has no data to be sent, send, to the PA, a first message of confirming that the PA is in a non-working state; and if the detection result is that the baseband chip has data to be sent, send, to the PA, a second message of confirming that the PA is in a working state.

Specifically, the signaling data for establishing the connection between the wireless terminal and the wireless network side may be request data initiated by the wireless terminal to the wireless network side for establishing a DCH link connection. The request data is sent to the wireless network side through a RACH.

In the wireless terminal in the embodiment of the present disclosure, the focus is on whether there is data to be sent to the wireless network side before the wireless terminal establishes the connection to the wireless network side, that is, the request data for establishing the DCH link connection, which corresponds to a link establishment request in the first row in FIG. 3. If the link establishment request exists, the baseband chip of the wireless terminal performs control to turn on the PA. After the sending of the link establishment request is finished, the baseband chip performs control to turn off the PA, thereby effectively reducing electrical power consumption of the PA and the wireless terminal.

Embodiment 9 of the present disclosure provides a data sending apparatus. Compared with Embodiment 4 of the present disclosure, a difference lies in that the first unit is configured to detect, before a connection to a wireless network side is established, whether a wireless terminal has data to be sent to the wireless network side, where the data includes signaling data for establishing the connection between the wireless terminal and the wireless network side.

Specifically, the signaling data for establishing the connection between the wireless terminal and the wireless network side may be request data initiated by the wireless terminal to the wireless network side for establishing a DCH link connection. The request data is sent to the wireless network side through a RACH.

In the data sending apparatus in the embodiment of the present disclosure, the focus is on whether there is data to be sent to the wireless network side before the wireless terminal establishes the connection to the wireless network side, that is, the request data for establishing the DCH link connection, which corresponds to a link establishment request in the first row in FIG. 3. If the link establishment request exists, a baseband chip of the wireless terminal performs control to turn on a PA. After the sending of the link establishment request is finished, the baseband chip performs control to turn off the PA, thereby effectively reducing electrical power consumption of the PA and the wireless terminal.

Embodiment 10 of the present disclosure provides a data sending system, where the data sending system includes a wireless terminal and a wireless network side device. The wireless terminal and the wireless network side device are in a communication connection. The wireless network side device may specifically be a base station device positioned on a wireless network side. Therefore, for a specific implementation manner of the wireless terminal, reference may be made to the implementation manner of the wireless terminal described in Embodiment 8, and details are not repeatedly described herein.

Embodiment 11 of the present disclosure provides a data sending system, where the data sending system includes a data sending apparatus and a wireless network side device. The data sending apparatus and the wireless network side device are in a communication connection. The wireless network side device may specifically be a base station device positioned on a wireless network side. Therefore, for a specific implementation manner of the data sending apparatus, reference may be made to the implementation manner of the data sending apparatus described in Embodiment 9, and details are not repeatedly described herein.

Embodiment 12 of the present disclosure provides a data sending method. A difference between this embodiment and Embodiment 1 of the present disclosure lies in that step 101 is detecting, after a connection between a wireless terminal and a wireless network side is established, whether the wireless terminal has data to be sent to the wireless network side, where the data to be sent includes signaling data or user data.

Specifically, the connection between the wireless terminal and the wireless network side is a DCH link connection. The signaling data in the data to be sent is sent to the wireless network side through a dedicated control channel (DCCH), and the user data in the data to be sent is sent to the wireless network side through a dedicated traffic channel (DTCH).

Apparently, when the data sending method in Embodiment 12 is compared with that in Embodiment 2, the data to be sent to the wireless network side is sent after the connection to the wireless network side is established, that is, the data to be sent to the wireless network side is sent after the wireless terminal enters an RRC-DCH state.

In the data sending method in the embodiment of the present disclosure, the focus is on whether there is data to be sent to the wireless network side after the connection to the wireless network side is established. The data includes the signaling data sent to the wireless network side through the DCCH, which corresponds to the signaling data of the dot matrix square in the second row in FIG. 3, and the user data sent to the wireless network side through the DTCH, which corresponds to the user data of the diagonal square in the second row in FIG. 3. If the signaling data and/or the user data exist, a baseband chip of the wireless terminal performs control to turn on a PA. After the sending of the link establishment request is finished, the baseband chip performs control to turn off the PA, thereby effectively reducing electrical power consumption of the PA and the wireless terminal.

Embodiment 13 of the present disclosure provides a wireless terminal. Compared with Embodiment 3 of the present disclosure, a difference lies in that the baseband chip 401 is configured to detect, after a connection between a wireless terminal and a wireless network side is established, whether the baseband chip has data to be sent, where the data to be sent includes signaling data or user data; if a detection result is that the baseband chip has no data to be sent, send, to a PA, a first message of confirming that the PA is in a non-working state; and if the detection result is that the baseband chip has data to be sent, send, to the PA, a second message of confirming that the PA is in a working state.

Specifically, the connection between the wireless terminal and the wireless network side is a DCH link connection. The signaling data in the data to be sent is sent to the wireless network side through a DCCH, and the user data in the data to be sent is sent to the wireless network side through a DTCH.

In the wireless terminal in the embodiment of the present disclosure, the focus is on whether there is data to be sent to the wireless network side after the connection to the wireless network side is established. The data includes the signaling data sent to the wireless network side through the DCCH, which corresponds to the signaling data of the dot matrix square in the second row in FIG. 3, and the user data sent to the wireless network side through the DTCH, which corresponds to the user data of the diagonal square in the second row in FIG. 3. If the signaling data and/or the user data exist, the baseband chip of the wireless terminal performs control to turn on the PA. After the sending of the link establishment request is finished, the baseband chip performs control to turn off the PA, thereby effectively reducing electrical power consumption of the PA and the wireless terminal.

Embodiment 14 of the present disclosure provides a data sending apparatus. Compared with Embodiment 4 of the present disclosure, a difference lies in that the first unit is configured to detect, after a connection between a wireless terminal and a wireless network side is established, whether the wireless terminal has data to be sent to the wireless network side, where the data includes signaling data or user data.

Specifically, the connection between the wireless terminal and the wireless network side is a DCH link connection. The signaling data in the data to be sent is sent to the wireless network side through a DCCH, and the user data in the data to be sent is sent to the wireless network side through a DTCH.

In the data sending apparatus in the embodiment of the present disclosure, the focus is on whether there is data to be sent to the wireless network side after the connection to the wireless network side is established. The data includes the signaling data sent to the wireless network side through the DCCH, which corresponds to the signaling data of the dot matrix square in the second row in FIG. 3, and the user data sent to the wireless network side through the DTCH, which corresponds to the user data of the diagonal square in the second row in FIG. 3. If the signaling data and/or the user data exist, a baseband chip of the wireless terminal performs control to turn on a PA. After the sending of the link establishment request is finished, the baseband chip performs control to turn off the PA, thereby effectively reducing electrical power consumption of the PA and the wireless terminal.

Embodiment 15 of the present disclosure provides a data sending system, where the wireless terminal includes a wireless terminal and a wireless network side device. The wireless terminal and the wireless network side device are in a communication connection. The wireless network side device may specifically be a base station device positioned on a wireless network side. Therefore, for a specific implementation manner of the wireless terminal, reference may be made to the implementation manner of the wireless terminal described in Embodiment 13, and details are not repeatedly described herein.

Embodiment 16 of the present disclosure provides a data sending system, where the data sending system includes a data sending apparatus and a wireless network side device. The data sending apparatus and the wireless network side device are in a communication connection. The wireless network side device may specifically be a base station device positioned on a wireless network side. Therefore, for a specific implementation manner of the data sending apparatus, reference may be made to the implementation manner of the data sending apparatus described in Embodiment 14, and details are not repeatedly described herein.

Embodiment 17 of the present disclosure provides a computer readable storage medium, where the computer stores a computer program code, and when the computer program code is executed by a computer, the computer program code may enable the computer to execute the steps of the methods in Embodiment 1, Embodiment 2, Embodiment 7, or Embodiment 12 of the present disclosure.

Embodiment 18 of the present disclosure provides a computer program product, where the computer program product includes a computer program code, and when the computer program code is executed by a computer, the computer program code may enable the computer to execute the steps of the methods in Embodiment 1, Embodiment 2, Embodiment 7, or Embodiment 12 of the present disclosure.

Although the present disclosure has been described with reference to specific features and embodiments thereof, it should be understood by persons skilled in the art that various changes and substitutions can be made thereto without departing from the spirit and scope of the disclosure as defined by the following claims.

What is claimed is:

1. A method of energy saving for a wireless terminal, the method comprising: establishing, by the wireless terminal, a dedicated channel (DCH) connection with a wireless network;
    entering, by the wireless terminal, a radio resource control (RRC)-DCH state, wherein the DCH connection is maintained for the wireless terminal to send and receive data in the RRC- DCH state;
    determining, by the wireless terminal, whether the wireless terminal has uplink data on a packet data convergences protocol (PDCP) sublayer that needs to be sent to the wireless network; and
    shutting off an uplink power amplifier (UPA) of the wireless terminal while the DCH connection is maintained for the wireless terminal to receive data from the wireless network when the wireless terminal has no uplink data on the PDCP sublayer that needs to be sent;
    wherein the DCH connection is maintained for the wireless terminal to send signaling data through a dedicated control channel (DCCH) and to send user data through a dedicated traffic channel (DTCH) to the wireless network.

2. The method of claim 1, further comprising keeping a downlink power amplifier (DPA) open for the wireless terminal to receive data from the wireless network.

3. The method of claim 1, further comprising turning on the UPA in a case that the wireless terminal has uplink data that needs to be sent.

4. The method of claim 1, wherein the UPA is shut off by a baseband chip of the wireless terminal.

5. The method of claim 1, wherein the UPA is shut off by a command via an enable interface of the UPA.

6. The method of claim 1, wherein the UPA is shut off with a safety delay.

7. The method of claim 6, wherein the safety delay is at least 5 milliseconds (ms).

8. A wireless terminal, comprising:
    an uplink power amplifier (UPA); and
    a baseband chip coupled to the UPA and configured to:
    establish a dedicated channel (DCH) connection with a wireless network;
    enter a radio resource control (RRC)-DCH state, wherein the DCH connection is maintained for the wireless terminal to send and receive data in the RRC-DCH state;
    determine whether the wireless terminal has uplink data on a packet data convergences protocol (PDCP) sublayer that needs to be sent to the wireless network; and
    shut off the UPA while the DCH connection is maintained for the wireless terminal to receive data from the wireless network when the wireless terminal has no uplink data on the PDCP sublayer that needs to be sent;
    wherein the DCH connection is maintained for the wireless terminal to send signaling data through a dedicated control channel (DCCH) and to send user data through a dedicated traffic channel (DTCH) to the wireless network.

9. The wireless terminal of claim 8, wherein the baseband chip is further configured to keep a downlink power amplifier (DPA) open for the wireless terminal to receive data from the wireless network.

10. The wireless terminal of claim 8, wherein the baseband chip is further configured to turn on the UPA in a case that the wireless terminal has uplink data that needs to be sent.

11. The wireless terminal of claim 8, wherein the UPA is shut off by a command via an enable interface of the UPA.

12. The wireless terminal of claim 8, wherein the UPA is shut off with a safety delay.

13. The wireless terminal of claim 12, wherein the safety delay is at least 5 milliseconds (ms).

14. The wireless terminal of claim 8, wherein the DCH connection is maintained for the wireless terminal to send signaling data through a dedicated control channel (DCCH).

15. A non-transitory computer readable storage medium, wherein the non-transitory computer readable storage medium stores a computer program code that, when executed by a wireless terminal, enables the wireless terminal to execute the following steps:
    establishing a dedicated channel (DCH) connection with a wireless network;
    entering a radio resource control (RRC)-DCH state during which the DCH connection is maintained for the wireless terminal to send and receive data; determine whether the wireless terminal has uplink data on a packet data convergences protocol (PDCP) sublayer that needs to be sent to the wireless network; and
    shutting off an uplink power amplifier (UPA) of the wireless terminal while the DCH connection is maintained for the wireless terminal to receive data from the wireless network when the wireless terminal has no uplink data on the PDCP sublayer that needs to be sent;
    wherein the DCH connection is maintained for the wireless terminal to send signaling data through a dedicated control channel (DCCH) and to send user data through a dedicated traffic channel (DTCH) to the wireless network.

* * * * *